(12) United States Patent
Smith et al.

(10) Patent No.: US 6,460,226 B1
(45) Date of Patent: Oct. 8, 2002

(54) METHOD AND DEVICE FOR SECURING A KNOT

(75) Inventors: Dennis Ray Smith, Burtsonsville, MD (US); Philip Garcin Malone, Vicksburg, MS (US)

(73) Assignee: The United States of America Corps of Engineers as respresented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/645,517

(22) Filed: Aug. 25, 2000

(51) Int. Cl.[7] .............................. F16G 11/00
(52) U.S. Cl. ...................... 24/115 R; 24/128
(58) Field of Search ................ 24/115 R, 128, 24/129 R, 129 D; 403/209

(56) References Cited

U.S. PATENT DOCUMENTS

| | | | |
|---|---|---|---|
| 2,577,466 A | 12/1951 | Jones | |
| 3,584,606 A | * 6/1971 | Reidhead | ............ 403/209 |
| 3,738,692 A | 6/1973 | Schmidt et al. | |
| 3,831,320 A | 8/1974 | Martuch | |
| 4,140,412 A | 2/1979 | Vitt | |
| 4,177,542 A | * 12/1979 | Denney | ............ 24/115 R |
| 4,385,759 A | * 5/1983 | Everroad | ............ 273/DIG. 12 |
| 5,229,178 A | 7/1993 | Zemitis | |
| 5,405,352 A | 4/1995 | Weston | |
| 5,562,268 A | 10/1996 | Kammerer | |
| 5,724,710 A | * 3/1998 | Hancock | ............ 24/129 D |

* cited by examiner

Primary Examiner—James R Brittain
(74) Attorney, Agent, or Firm—John A. MacEvoy

(57) ABSTRACT

A device for securing a knot in a tight condition in a cord includes a generally tubular member defining a longitudinal hole therethrough. The tubular member includes a score line for dividing it into two sections by applying a bending or torsional force on the ends thereof. The tubular member further includes a longitudinal slit extending substantially through the thickness thereof. A pre-stretched elastomeric band is disposed around the tubular member.

11 Claims, 1 Drawing Sheet

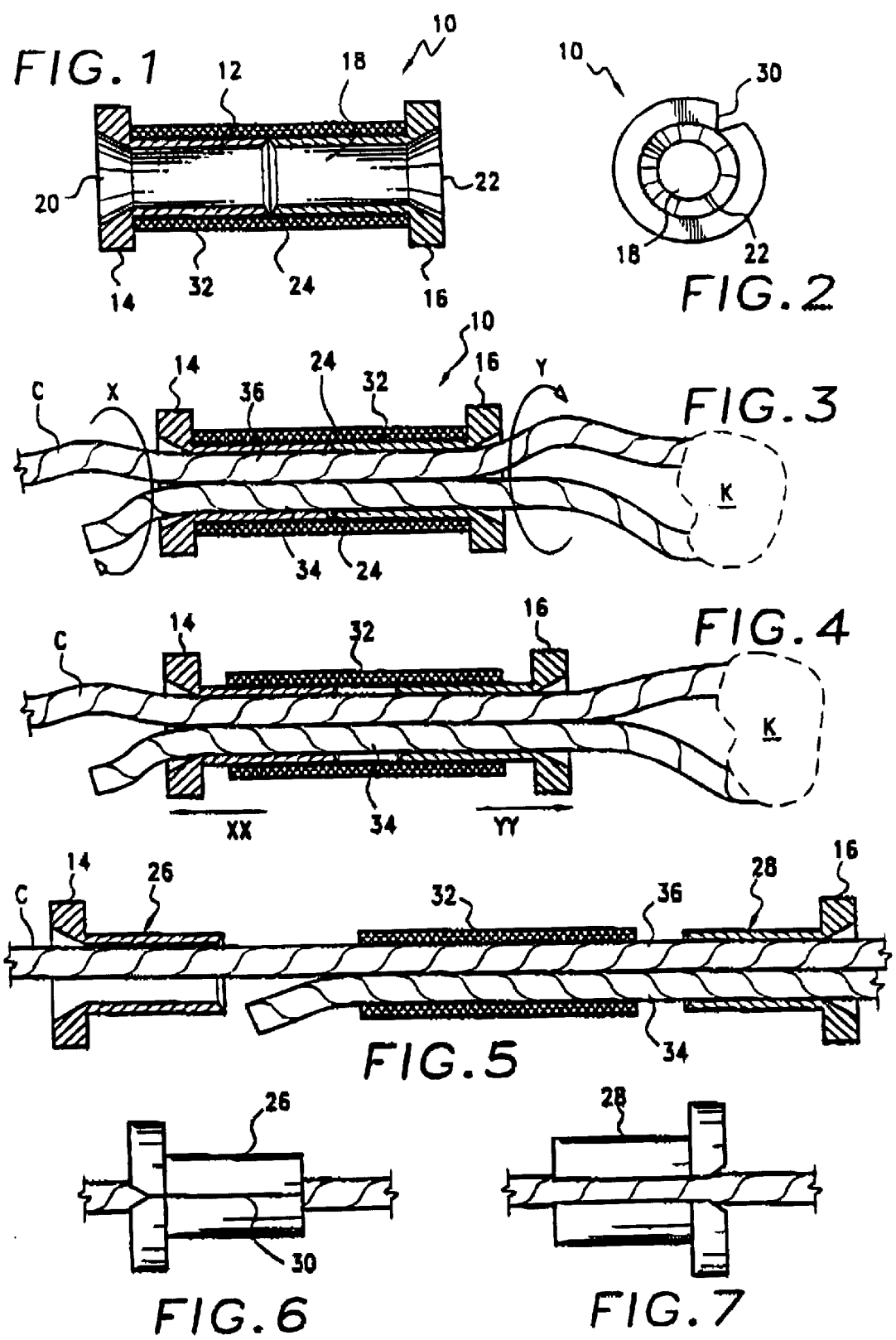

METHOD AND DEVICE FOR SECURING A KNOT

FIELD AND HISTORICAL BACKGROUND OF THE INVENTION

The present invention is directed to a method and device for securing a knot against loosening. More particularly, the present invention is directed to a device that allows a pre-stretched elastomer band to be placed over the knot or over the ends of the cord or rope that emerges from the knot to prevent the knot from loosening or becoming undone.

Slackening and tensioning a rope, cord or line can cause the knots to loosen. The problem of loosening is particularly evident when knots are tied in smooth, stiff lines, such as monofilament made of nylon or Dacron.

An examination of the literature on knots shows that the strategy of attaching a rope below the knot to the rope above the knot is key to securing of simple knots like the half-hitch, the carrick bend, and the reeving-line bend. In all of these knots, the ends of the rope above and below the knot are placed parallel to one another and wrapped with a smaller cord. "Seized" is a term used for this procedure. This step of tying a knot is called "seizing back the end of the rope".

Other methods of securing ropes in parallel position include the use of an adhesive or an adhesive-coated tape. However, adhesives often contain a solvent that can weaken the fiber in the lines being attached. This damage to the lines is particularly important where a monofilament of nylon or Dacron is used. Tape is difficult to use on very thin lines like monofilament. In the case of ropes, moisture can get to the underside of the tape, weaken the adhesive and cause the tape to peel off. Any coating applied to the rope by painting on a liquid elastomer or dipping the rope in an elastomer has to dry or cure before the rope can be used. However, coatings are often not useful on thin monofilament lines since the lines are hard and smooth and coatings typically will peel-off. Where a line is to be used in fishing, it is important that solvents and related materials not be released into the water where they may add to repel fish. Although thermal "shrink tube" maybe used over a knot, it is not always convenient to apply heat to the shrink tube. In addition, heating the shrink tube can result in damage to the cord in the shrink tube.

Various knotting and joining rope ends techniques are disclosed in U.S. Pat. Nos. 2,577,466; 3,738,692; 3,831,309; 4,140,412; 5,229,178; 5,405,352; and 5,562,684.

In particular, U.S. Pat. No. 2,577,466 to Jones discloses a method of joining leaders to fish hooks which includes inserting through the eye of the fish hook an end of the leader, positioning the portion of the leader adjacent the end against the shank of the hook, encircling with a plastic sleeve the eye and the portion of leader lying against the shank, and shrinking the sleeve adjacent its opposite ends above the leader and above the shank.

U.S. Pat. No. 3,738,692 to Schmidt et al. discloses the use of a band of a shrinkable polymeric material or a coating around a pre-tied, but untightened nail knot in a monofilament line. The shrinkable tubing and the coating are placed only on the untied knot to hold the twisted line in place until the knot can be completed and tightened. When the knot is formed and tightened, the tubing or coating is removed.

U.S. Pat. No. 3,831,309 to Martuch discloses the use of monofilament line as the tippet and in the butt section of a fishing leader. Knotting is used to fabricate a fishing leader with a removable end section.

U.S. Pat. No. 4,140,412 to Vitt discloses a method of covering a joint of two rope ends which includes using a joint cover constructed of plastic tubing, heat shrinkable plastic tubing, with methods to form a conical wedge-shaped cover. The joint cover functions to help provide a smooth movement of the joint around obstacles.

U.S. Pat. No. 5,229,178 to Zemitis discloses the combination of a shock cord including a shark cord loop at an end thereof, a serving tightly disposed above the shark cord immediately adjacent to the shark cord loop, and a binding tightly disposed above the serving and connected to the serving and shock cord.

U.S. Pat. No. 5,405,352 to Weston discloses a slipknot for use as a suture knot in surgical procedures, along with the method for such knot's formation and a pre-formed suture system which provides a protoknot of the suture knot mounted on a tubular member or a knot tightner having a channel passing therethrough.

U.S. Pat. No. 5,562,684 to Kammerer discloses a surgical knot pusher device including a thick-walled cannula or tube having a beveled elliptical face and a central channel for slidably receiving one end of a suture.

There remains a need in the industry for an effective and easy to use method and device for securing a knot against loosening.

OBJECTS AND SUMMARY OF THE INVENTION

The principal object of the present invention is to provide a method and device for maintaining a knot in a tight condition.

An object of the present invention is to provide a method and device for securing a knot in a tight condition by placing an elastomer band or an elastomer band and an adhesive over the tightened knot.

Another object of the present invention is to provide a method and device for securing a knot in a tight condition in which the end of the cord beyond the point where the knot is tied is held parallel to the cord above the knot to prevent the knot from becoming loose. By maintaining the two lines in a parallel relationship, the strain on the cord tightens a properly tied knot.

Yet another object of the present invention is to provide a method and device for installing an elastomer band that will hold the rope sections and which can be installed conveniently and quickly. Further, the device would allow the use of a castable adhesive material placed under the elastomer band.

Still yet another object of the present invention is to provide a method and device for securing a knot which uses an elastomer band or an elastomer band and an adhesive to seize back the end of the rope to ensure that a knot in the rope will remain tight.

An additional object of the present invention is to provide a method and device for covering a line or a knot with an elastomer band to prevent the knot from becoming loose. The installation of the band can be done with or without adhesives and no heating is required. The band is designed to stay in place even if the adhesive is weakened.

Yet an additional object of the present invention is to provide a method and device for securing a line or knot with an elastomer band to prevent the end of the rope from becoming unraveled. The band functions to "whip" the end of the rope. The installation of a band can also be used to replace the insulation on an electrical wire or cover a wire splice.

In accordance with the present invention, a device for securing a knot in a tight condition in a cord includes a generally tubular member defining a longitudinal hole therethrough. The tubular member includes a score line for dividing it into two sections by applying a bending or torsional force on the ends thereof. The tubular member further includes a longitudinal slit extending substantially through the thickness thereof. A pre-stretched elastomeric band is disposed around the tubular member.

BRIEF DESCRIPTION OF THE DRAWINGS

The above and other objects, novel features and advantages of the present invention will become apparent from the following detailed description of the invention, as illustrated in the accompanying drawings, in which:

FIG. 1 is a cross-sectional view of the device of the present invention;

FIG. 2 is an end view of the device shown in FIG. 1; and

FIGS. 3–7 illustrate the method of the invention for securing a knot in a tight condition by using the device of the invention.

DETAILED DESCRIPTION OF THE INVENTION

As best shown in FIG. 1, a device for "seizing the rope" includes a spool-like member 10 with a reduced diameter central section 12, and slightly larger diameter end sections 14 and 16. A hole 18 extends longitudinally through the spool 10 and has end openings 20 and 22. The spool is scored at approximately its mid-point 24 in such a way as to break transversely into two sections 26 and 28 (FIG. 5), when a bending or torsional force is applied on the ends 14 and 16.

As best shown in FIG. 2, spool 10 includes a longitudinal slit 30 extending from the central opening 18 to the exterior thereof. In other words, the slit 30 extends substantially through the thickness of the spool 10. An elastomeric band or tube 32 is stretched and is placed around the central portion 12 of the spool 10. The spool 10 is preferably made of a rigid plastic or metal material.

In use, a rope or cord C including free end 34 is provided. The cord C is threaded through the spool 10 by extending the free end portion 34 through the central hole 18 until the free end 34 thereof extends past the end section 16. A knot K is then made in the cord C adjacent the free end portion 34 and the end portion 34 is then threaded back through the central hole 18 of the spool 10 such that the end portion 34 comes to lie adjacent the cord section 36 below the knot K (FIG. 3). In other words, the free end section 34, which is above the knot K, comes to lie substantially parallel to the cord section 36 below the knot K (FIG. 4). The end portions 14 and 16 of the spool 10 are then twisted so as to break the spool 10 about the score point 24 (see arrows X and Y in FIG. 3).

The end portions 14 and 16 of the spool 10 are then pulled apart in opposite directions, sliding along the rope sections 34 and 36 so that the elastomer band 32 tightly engages the rope sections 34 and 36 (see arrows XX and YY in FIG. 4, and FIG. 5). Since the elastomer tubular band 32, as shown in FIG. 1, is in pre-stretched condition, when the spool 10 is split into two sections 26 and 28 and spread apart (as shown in FIG. 5), the band 32 unstretches and comes to tightly squeeze the rope sections 34 and 36 together, "seizing back the rope above the knot". The two end portions 26 and 28 of the spool 10 are removed from the rope C by splitting the slit 30 open to allow the rope to become free therefrom (FIGS. 6 and 7).

Although not shown, an adhesive may be used to coat the rope in the area where they are to be "seized" by the spool 10, prior to slipping over the device 10 of the present invention. In this instance, the elastomeric tube or band would be installed over the adhesive on the rope C. The adhesive is selected so as to bond with the rope and the elastomeric tube 32.

It is noted that the device of the present invention can be modified to produce an elastomeric tube with a closed end which would fit over the end of a rope and to hold the fibers of the rope together to prevent unraveling. The tube is then fitted with one-half of the spool of the invention and the rope is inserted into the central hole in the half-spool. The half-spool in then pulled out and the elastomeric tube covers the end of the rope. The half-spool is then pried open about its longitudinal slit, in the manner noted above, to separate it from the rope.

While this invention has been described as having preferred ranges, steps, materials, or designs, it is understood that it is capable of further modifications, uses and/or adaptations of the invention following in general the principle of the invention, and including such departures from the present disclosure, as those come within the known or customary practice in the art to which the invention pertains and as may be applied to the central features hereinbefore set forth, and fall within the scope of the invention and of the appended claims. It is further understood that the present invention is not limited to the claims appended hereto.

What is claimed is:

1. A device for securing a knot in a cord, comprising:

a generally tubular member circumscribing a hole longitudinally there through;

wherein said tubular member includes a score line about its circumference to assist in dividing it into two sections by applying a force at the ends of said tubular member; and wherein said tubular member includes a longitudinal slit extending radially through the depth of one side of said tubular member; and a stretchable tube circumscribing at least a part of the length of said tubular member.

2. The device of claim 1, in which said tubular member comprises a spool member with a central section of a first diameter and end sections of a second diameter.

3. The device of claim 2, in which said first diameter is less than said second diameter.

4. The device of claim 3, in which said stretchable tube circumstances at least a part of said central section.

5. The device of claim 1, in which said stretchable tube comprises a pre-stretched elastomer tube.

6. The device of claim 1, in which said tubular member consists essentially of a material selected from the group consisting of rigid plastic, metal, and combinations thereof.

7. The device of claim 1, in which said slit extends the length of said tubular member.

8. A method of securing a knot in cord, comprising:

a) providing a cord with first and second end portions;

b) providing a knot securing device, comprising:

a tubular member circumscribing a hole longitudinally there through;

wherein said the tubular member includes a score line around its circumference to faciliate dividing it into two sections, and wherein said tubular member includes a longitudinal slit extending radially through the depth of one said of said tubular member and a stretchable tube circumscribing at least part of the length of said tubular member;

c) threading said cord through said knot securing device by extending said first end portion of said cord through said hole in said tubular member;

d) tying a knot in said cord adjacent said first end portion thereof;

e) threading said first end portion of said cord back through said hole in said tubular member such that said knot remains outside of said knot securing device and said first end portion is adjacent said cord at least within said knot securing device;

f) dividing said knot tying device into two sections by applying a force at each of the ends thereof; and g) sliding said two sections in opposite directions over said cord such that said stretchable tube circumscribes both said cord and said first end portion thereof.

9. The method of claim 8, further comprising:

h) removing said two sections of said knot tying device by opening each at said longitudinal slit and lifting each said section from said cord.

10. The method of claim 8, further comprising:

i) prior to step e), coating with adhesive at least part of the portion of said cord that will be circumscribed by said stretchable tube.

11. The method of claim 8, in which the said knot securing device consists essentially of material selected from the group consisting of rigid plastic metal, and combinations thereof.

* * * * *